UNITED STATES PATENT OFFICE.

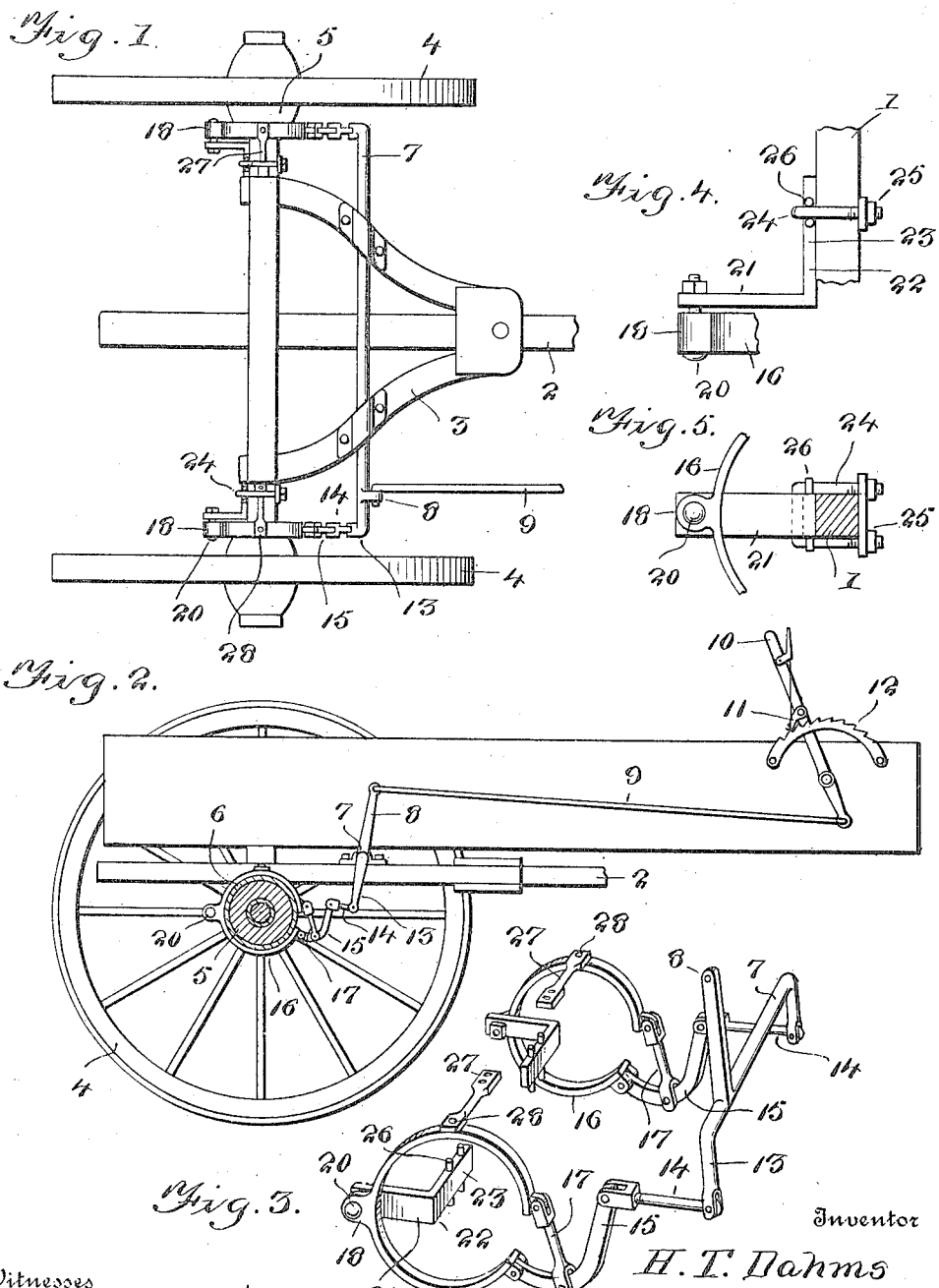

HENRY T. DAHMS, OF WALCOTT, IOWA.

VEHICLE-BRAKE.

1,206,419.

Specification of Letters Patent.

Patented Nov. 28, 1916.

Application filed November 13, 1915. Serial No. 61,350.

*To all whom it may concern:*

Be it known that I, HENRY T. DAHMS, a citizen of the United States, residing at Walcott, in the county of Scott and State of Iowa, have invented new and useful Improvements in Vehicle-Brakes, of which the following is a specification.

This invention relates to vehicle brakes, and particularly to band brakes adapted to be applied to the hubs of wagon and other vehicle wheels.

One object of the invention is to provide a simple, reliable and efficient construction of brake mechanism, which may be applied to existing types of vehicles, and which is positive and reliable in action at all times.

A further object of the invention is to provide simple and efficient means for attaching the brake bands with the axle and for connecting the same with the operating means, whereby certainty and reliability in application and release of the brake bands is insured.

The invention consists of the features of construction, combination and arrangement of parts herein fully described and claimed, reference being had to the accompanying drawing in which:—

Figure 1 is a top plan view of a running gear equipped with the improved brake. Fig. 2 is a side elevation, partly in section, of the same. Fig. 3 is a detail view in perspective of each of the brake bands and related parts. Figs. 4 and 5 are detail views showing features of construction.

Referring to the drawing, 1 designates the rear axle, 2 the reach, 3 the rear hounds, and 4 the rear wheels of an ordinary running gear, on the hubs 5 of which wheels are mounted brake drums 6.

Journaled upon the rear hounds 3 is a horizontal transverse rock shaft 7 having an arm or crank 8 which is connected by a rod 9 with a hand lever 10, said lever being mounted in the customary manner and provided with a dog or catch 11 to engage a rack segment 12 for the purpose of securing the lever in a variety of adjusted positions. The rock shaft 7 is also provided at each end with a downwardly extending arm 13, which is coupled by a connecting rod 14 to one end of a longitudinally curved actuating link 15, which is pivotally connected at one end with one end of a brake band 16. The brake bands 16 surround the drums 6 on the wheel hubs 5, and the opposite end of each brake band is coupled by a connecting rod 17 with the intermediate portion of the lever 15, whereby in opposite rocking movements of the lever 15 the brake band is adapted to be contracted and expanded. In practice, suitable spring mechanism may be employed for retracting the brake bands and parts of the brake mechanism upon release of the latch 11, but it is preferred to employ a direct mechanical connection, as shown, by which positive contracting and expanding movements of the bands to apply and release the same are secured when the operating mechanism is positively moved in opposite directions.

The intermediate or rear portion of each brake band is formed with an eye 18 to receive a bolt 20, which passes through one of the arms 21 of an angle metal bracket 22, which arm 21 extends in a direction longitudinally of the vehicle and parallel with the plane of rotation of the adjacent vehicle wheel. The other arm 23 of the bracket extends parallel with and abuts against the rear face of the axle 1, and is secured thereto by a U-shaped clip 24, the bolt 20 and arms of the clip 24 being threaded to receive suitable fastening and jamb or lock nuts 24 and 25, respectively. The arms of the clip may pass through or above and below the axle and one or both of said arms extend between retaining pins 26 on the bracket whereby relative displacement of the parts is prevented. Extending longitudinally over the ends of the axle are leaf springs 27 having flattened end portions and a rounded body or intermediate portion, the outer flattened end portions of the springs being connected with the brake bands by rivets 28. As shown, the inner flattened ends of the brake bands are perforated for the passage of fastenings to secure the same to the axle, but it will be noted that the body portions of these springs are arranged to extend under and to be engaged by the clips 24, which clips 24 thus serve to fasten the bracket arms 23 in position and to brace and reinforce the springs 27. These springs are employed to maintain the brake bands in proper position with respect to the wheel hubs, and also to assist in releasing or disengaging the brake bands from the drums on the hubs when the tension on said brake bands caused by the manipulation of the hand lever 10 is released.

It will be understood from the foregoing description that when the parts are assembled for use upon a vehicle a movement of the hand lever in one direction will rock the shaft 7 in the same direction, and as a result motion will be communicated to the brake bands through the intervening operating connections to contract said brake bands about the brake drums for the application of the brakes, these springs 27 being in such operation also placed under tension. When the operating lever is moved in the reverse direction, and reverse motion to that before described is thus applied to the shaft 7, the brake bands will be spread or expanded through the action of the intermediate operating connections and the reaction of the springs 27, thus releasing the brake bands or moving them away from the surfaces of the drums.

I claim:—

In a vehicle brake, the combination with an axle, and a wheel journaled thereon, said wheel being provided with a brake surface, of an L-shaped bracket having fastening and supporting arms extending respectively parallel with and at an angle to the axle, pairs of spaced retaining pins projecting from the upper and lower edges of the fastening arm of the bracket, a contracting brake band pivoted to the supporting arm of the bracket, a leaf spring secured at one end to the band and at its opposite end to the axle, in parallel relation to the latter, and serving to normally hold the band expanded and against lateral deflection, means for actuating the brake band, and a clip embracing the axle and also embracing the fastening arm of the bracket between the pairs of spaced pins thereof.

In testimony whereof I affix my signature in presence of two witnesses.

HENRY T. DAHMS.

Witnesses:
GEORGE LUEDEN,
HENRY HARSER.

Copies of this patent may be obtained for five cents each, by addressing the "Commissioner of Patents, Washington, D. C."